United States Patent [19]

Akesson

[11] Patent Number: 4,592,916
[45] Date of Patent: Jun. 3, 1986

[54] METHOD AND APPARATUS FOR FORMING CAKES

[75] Inventor: Yngve R. Akesson, Helsingborg, Sweden

[73] Assignee: Nestec S.A., Vevey, Switzerland

[21] Appl. No.: 670,220

[22] Filed: Nov. 13, 1984

Related U.S. Application Data

[63] Continuation-in-part of Ser. No. 491,296, May 3, 1983, abandoned.

[30] Foreign Application Priority Data

May 3, 1982 [EP] European Pat. Off. ........... 82103772

[51] Int. Cl.[4] ..................... A21C 15/00; A21D 13/08; A23G 3/00
[52] U.S. Cl. ...................................... 426/517; 83/125; 425/298; 425/398; 426/518; 426/502; 426/503; 426/285; 426/454; 426/446; 426/449; 426/559
[58] Field of Search ............... 426/502, 503, 518, 512, 426/517, 516, 446–449, 285, 454, 559; 83/125, 127, 128; 425/299, 298, 296, 398

[56] References Cited

U.S. PATENT DOCUMENTS

| | | | |
|---|---|---|---|
| 181,306 | 8/1876 | Blodget | 426/454 |
| 183,780 | 10/1876 | Shaver et al. | 83/125 |
| 264,528 | 9/1882 | Hall | 83/125 |
| 1,578,761 | 3/1926 | Rondolin | 426/503 |
| 1,618,906 | 2/1927 | Baker | 83/127 |
| 1,967,972 | 7/1934 | Rottenberg | 83/125 |
| 2,008,725 | 7/1935 | Parker | 30/130 |
| 2,120,138 | 6/1938 | Mathews et al. | 426/448 |
| 2,134,026 | 10/1938 | Brooks | 426/275 |
| 2,246,424 | 6/1941 | Turner | 426/512 |
| 2,248,292 | 7/1941 | Wilder | 426/454 |
| 2,271,908 | 2/1942 | Youngberg | 30/130 |
| 2,446,201 | 8/1948 | Turner | 83/125 |
| 2,623,479 | 12/1952 | Clinton | 83/128 |
| 3,022,693 | 2/1962 | Voorhees | 83/128 |
| 3,121,637 | 2/1964 | Clausi et al. | 426/454 |
| 3,385,715 | 5/1968 | Ishler et al. | 426/454 |
| 3,476,567 | 11/1969 | Wood et al. | 426/448 |
| 3,503,345 | 3/1970 | Abrams | 426/517 |
| 3,555,949 | 1/1971 | Treff | 83/125 |
| 3,580,727 | 5/1971 | Gulstad | 426/449 |
| 3,580,728 | 5/1971 | Gulstad | 426/449 |
| 3,722,398 | 3/1973 | Freye et al. | 425/204 |
| 3,732,109 | 5/1973 | Doat et al. | 426/559 |
| 3,924,012 | 12/1975 | Marshall et al. | 426/518 |
| 4,022,918 | 5/1977 | Miller | 426/446 |
| 4,075,359 | 2/1978 | Thulin | 426/517 |
| 4,092,093 | 5/1978 | Nakagawa | 426/512 |
| 4,178,392 | 12/1979 | Gobble et al. | 426/285 |
| 4,192,899 | 3/1980 | Roth | 426/524 |
| 4,195,489 | 4/1980 | Bernard | 426/524 |
| 4,202,911 | 5/1980 | Papantoniou et al. | 426/502 |
| 4,352,242 | 10/1982 | Plet | 426/518 |
| 4,438,146 | 3/1984 | Colby et al. | 426/448 |

FOREIGN PATENT DOCUMENTS

| | | | |
|---|---|---|---|
| 1552438 | 1/1968 | France . | |
| 786428 | 11/1957 | United Kingdom | 426/512 |
| 2132868 | 7/1984 | United Kingdom . | |

*Primary Examiner*—Steven Weinstein
*Attorney, Agent, or Firm*—Vogt and O'Donnell

[57] ABSTRACT

A method of forming a cake from a sticky confectionary material based on sugar and cereals comprising the steps of transporting a layer of such sticky confectionary material having a uniform thickness on a surface of an endless conveyor to a position beneath at least one vertically disposed hollow cylinder whose wall is tapered at its lower end and inside which is a piston, advancing the cylinder downwardly so that it cuts through the sticky material until the lower edge of said cylinder contacts said surface and severs the sticky material within the cylinder from the layer; then advancing the piston downwardly to compress the severed sticky material to between about 40% and about 60% of its original thickness to form the cake, maintaining such compression for between 0.5 and 5.0 seconds, and then retracting the cylinder and piston together upwardly so that the cylinder and piston carry with them the formed cake, and then advancing the piston downwardly to press out and release the formed cake from the cylinder.

8 Claims, 8 Drawing Figures

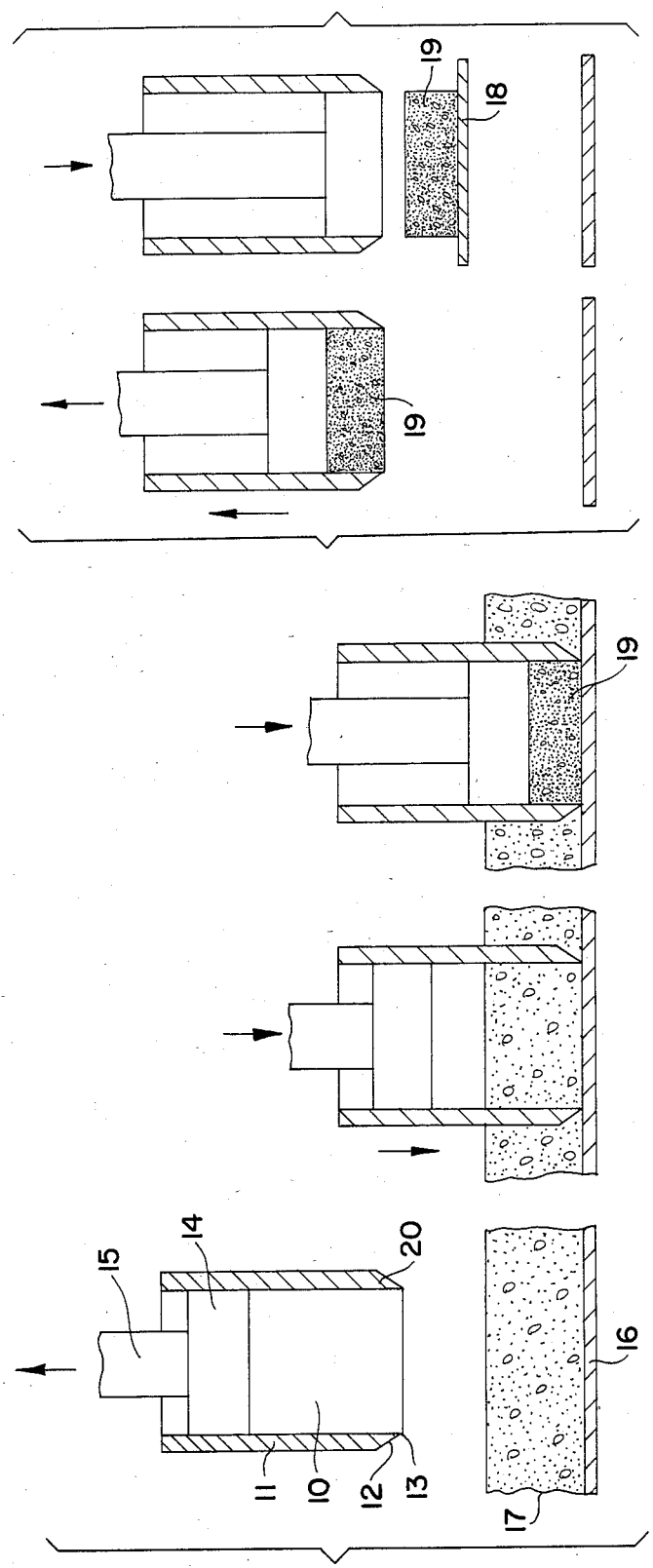

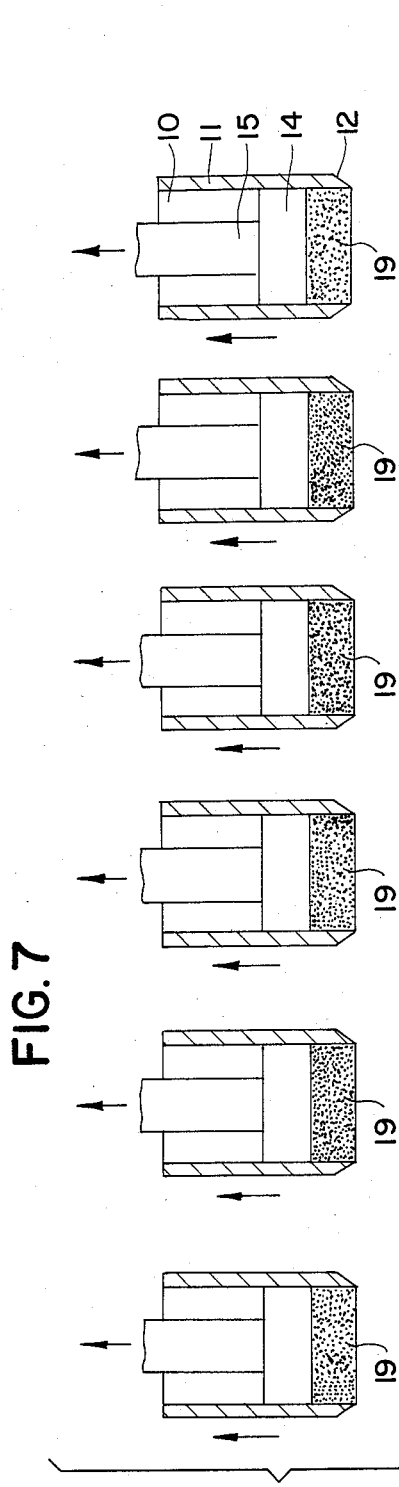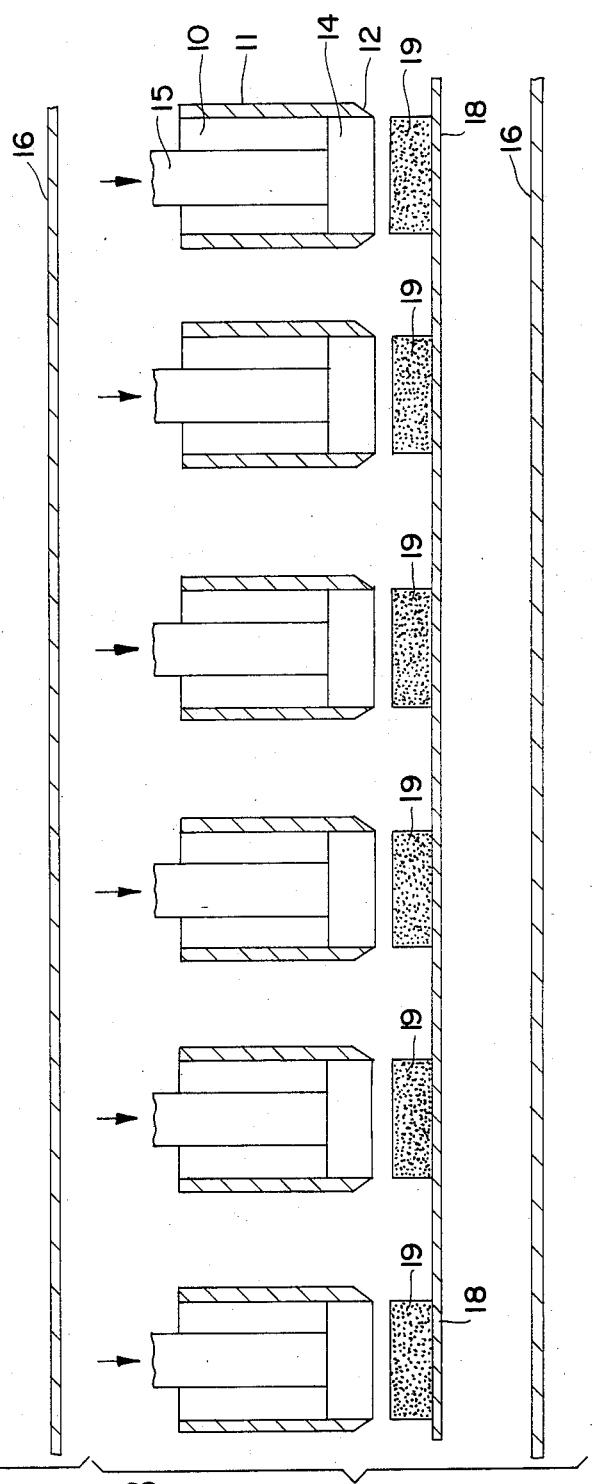

METHOD AND APPARATUS FOR FORMING CAKES

This application is a continuation-in-part of my earlier filed copending application Ser. No. 491,296, filed May 3, 1983, now abandoned.

The present invention relates to a method of forming cakes from a sticky confectionary material.

In high volume production of cakes from a sticky confectionary material such as a material based on sugar and cereals it is difficult to meet the requirements of high capacity and constant weight accuracy because of losses owing to the tendency of the sticky material to adhere to the working parts of the machinery used.

Generally, in the production of confectionary products such as cakes or biscuits from sticky confectionary materials, the material, for which means are provided to portion it to the appropriate weight, is received on a solid surface, pressed to form the required shape and size, and then removed from the solid surface and released to be transferred to the next stage of production. In such processes, it is often necessary to have separate means for cutting and/or portioning the material before or after it is received on the solid surface, pistons or plungers for pressing the material between two surfaces, heat to prevent the material sticking to at least one of those surfaces, suction to hold the formed pieces against one of the surfaces after separation of the surfaces, and plungers or pressure means for releasing the product. The solid surface on which the sticky material is received is often an endless conveyor.

French Patent No. 1,552,438 describes a method of forming dough pieces to cover filled pie shells. In this method, the dough is produced in predetermined portions, for example by means of a machine used to make biscuits before being transported to the station where the pieces are formed. At the station, a dough portion is placed on a solid surface and is pressed by the descent of a piston which has air conduits in its body. The two surfaces are heated, the lower surface being heated to a higher temperature so that when the piston is raised the dough piece sticks to the colder surface of the piston, aided if necessary by suction applied to the air conduits. The pie shell is then positioned beneath the piston to which the dough piece adheres and the piston is lowered so that the dough piece is pressed against the rim of the pie shell and finally the piston raised again, accompanied by expulsion of air through the air conduits to ensure separation of the piston from the dough piece. The method described in this patent thus requires separate portioning means, piston, heat, suction and pressure.

U.S. Pat. No. 3,722,398 describes an apparatus for producing cereal biscuits, which includes an endless conveyor comprised of a plurality of equal sized plates having openings extending from top to bottom thereof, which travel for a part of their path over a platform which causes the bottom openings to be closed and thus forms a number of open-top moulds. While travelling over the platform, the plates pass firstly underneath a filling apparatus where the moulds are filled with the product. They then pass underneath a set of plungers which compresses the product therein. The plates then move off the platform where the openings are returned to their original state i.e. not having bottoms, and a second set of plungers presses the product from the openings onto a conveyor where it is carried away. In the apparatus described in this patent the filling apparatus is quite specialised in that it is open at the top and bottom, and requires the presence of a plurality of tines rotated by a motor. In addition, the apparatus requires the aforementioned specialised belt, platform and two sets of plungers, one set for compressing the product and one set for releasing the product from the openings.

We have now devised an exceedingly simple method of forming cakes continuously from a sticky confectionary material whereby the sticky material is fed onto a conventional endless conveyor by conventional means and is cut, formed and released by a hollow cylinder inside which is a piston, and whereby means for suction, heat and separate plungers for compressing and releasing the product are unnecessary.

Accordingly, the present invention provides a method of forming a cake from a sticky confectionary material based on sugar and cereals comprising the steps of transporting a layer of such sticky confectionary material having a uniform thickness on a surface of an endless conveyor to a position beneath at least one vertically disposed hollow cylinder whose wall is tapered at its lower end and inside which is a piston, advancing the cylinder downwardly so that it cuts through the sticky material until the lower edge of said cylinder contacts said surface and severs the sticky material within the cylinder from the layer; then advancing the piston downwardly to compress the severed sticky material to between about 40% and about 60% of its original thickness to form the cake, maintaining such compression for between 0.5 and 5.0 seconds, and then retracting the cylinder and piston together upwardly so that the cylinder and piston carry with them essentially without other means the formed cake, and then advancing the piston downwardly to press out and release the formed cake from the cylinder.

The sticky confectionary material may be a conventional dough or it may be a cereal granulate treated with a syrup and the method of this invention is particularly advantageous for forming cakes or biscuits such as those described in British Patent No. 2132868 in which the sticky confectionary material is a mass produced by adding a binder, prepared by mixing from 8 to 30 parts by weight of sucrose and/or glucose syrup and from 5 to 15 parts by weight of water, to a base in granular form prepared by mixing from 40 to 80 parts by weight of cereal flour, from 0 to 20 parts by weight of sucrose, from 0.5 to 3 parts by weight of oil or fat and from 0 to 3 parts by weight of water and extrusion cooking under conditions such that an expanded cooked base having a density of from 0.1 to 0.3 g/cm$^3$ is obtained at the exit of an extrusion nozzle which is then reduced to granules.

As is explained in British Patent No. 2132868 on page 3 lines 10 to 13 the mass which is produced by the addition of the binder to the granules is viscous and sticky and its handling requires care and adequate mechanical means. It is important that the structure of the granules is not broken and the forming method of the present invention enables a cake or biscuit to be formed by cutting and compressing such a sticky material without the structure of the granules being broken, without the formation of lumps and without the formed cake or biscuit sticking to the walls of the cylinder or to the piston. In addition, when the cylinder and piston are retracted upwardly so that they carry with them the formed cake, the cake is held firmly in position without the need for additional means such as docking pins.

By "cylinder" in this invention we mean a hollow body of uniform internal cross-section throughout its length and whose wall is tapered at the outside of its lower end. The taper angle of the lower edge of the cylinder wall may suitably be from 10° to 20° and conveniently from 12.5° to 17.5°. Advantageously, the lower edge of the tapered cylinder is sharp to facilitate cutting all the way through the sticky material. When there is more than one cylinder, they are conveniently arranged in a row across the conveyor at right angles to the direction of travel.

The piston has an external cross-section complementary to the internal cross-section of the cylinder and conveniently both cross-sections may be circular. Both the cylinder and the piston may be made of plastics material. If desired, the face of the piston which compresses the sticky material may be formed with a pattern of any desired shape which is printed onto the sticky material when the piston compresses it.

The sticky confectionary material may conveniently be stored in a hopper from which it is fed onto the endless conveyor and distributed as a layer of roughly the same width and length as is covered by the forming cylinder or row of forming cylinders.

Before the sticky material is transported to the position beneath the hollow cylinder it advantageously passes under a levelling device, such as a scraper, by means of which it is disposed as a layer of uniform thickness. The use of a scraper is particularly advantageous for levelling the mass of sticky confectionary material used for forming biscuits such as described in British Patent No. 2132868 because it is important that this mass of sticky material is not unduly compressed before passing underneath the cylinder and piston otherwise the structure of the granules may be broken, as would happen if the sticky material were levelled by compression under a roller.

Preferably, the endless conveyor is adapted to run intermittently so that it is stationary while the hollow cylinder is advanced downwardly and is moved when the hollow cylinder and piston are retracted upwardly together carrying with them the formed cake. Conveniently, the dosing of the sticky material onto the conveyor takes place when the latter is stationary and stops when the conveyor moves. By this means, there may be a plurality of bands of sticky material lying transversely across the conveyor, one band separated from another by a transverse gap free of sticky material and this ensures that any excess sticky material removed by the scraper during levelling will be forced into the gap, thus avoiding any substantial "backing-up" of the sticky material.

Advantageously, the pressure applied by the piston is sufficient to compress the severed sticky material to from 45% to 55% and especially from 47.5% to 52.5% of its original thickness. Preferably, the compression is maintained for a period from 1.0 to 3.0 seconds and especially from 1.5 to 2.5 seconds.

When the formed cake is released by advancing the piston downwardly to press it out of the cylinder, it is conveniently conveyed away by falling onto a shuttle table which is inserted in the space between the cylinder and the endless conveyor when the cylinder is in its ascended position and then retracted carrying the formed cake.

The weight of the formed cake is thus easily determined by the diameter of the cylinder and the thickness of the sticky material on the endless conveyor. The weight of the formed cake can be easily varied by controlling the thickness of the sticky material on the conveyor belt, for instance, by feeding the desired amounts onto the conveyor and adjusting the height of the scraper accordingly. Any surplus sticky material remaining on the endless conveyor may easily be recirculated by falling on to a transport system which reconveys it to the hopper.

A programme unit may be incorporated to coordinate all the movements occurring in the method of this invention.

The present invention also provides an apparatus for forming cakes from a sticky confectionary material characterised in that it comprises an endless conveyor adapted to run intermittently, above which is a vertically disposed hollow cylinder whose wall is tapered at its lower end and inside which is a piston, means for feeding a sticky confectionary material onto the endless conveyor and forming the sticky material on the conveyor into a layer of uniform thickness, means for lowering the cylinder to cut through the sticky material until its lower edge contacts the endless conveyor, means for lowering the piston after the lower edge of the cylinder contacts the conveyor so that the piston compresses the sticky material to a thickness between about 40% and about 60% of the thickness of said layer to thereby form a cake, said piston lowering means being operative to maintain the pressure of the piston on the cake for between 0.5 and 5.0 seconds, means for raising the cylinder and piston together carrying with them the formed cake, means for lowering the piston to press out and release the formed cake and means for transporting the formed cake away from the endless conveyor.

The drive systems for the cylinder and piston are preferably pneumatic.

BRIEF DESCRIPTION OF THE DRAWINGS

The present invention is further illustrated by way of example with reference to the following drawings in which:

FIGS. 1 to 5 are diagrammatic sectional views showing the different stages in forming a stable cake from a sticky confectionary material on an endless conveyor by means of a hollow cylinder inside which is a piston.

FIG. 6 is a diagrammatic side view of a machine used for the method and FIGS. 7 and 8 are diagrammatic sectional views showing six cylinders arranged transversly across the belt at different stages of the process.

Figure 6:
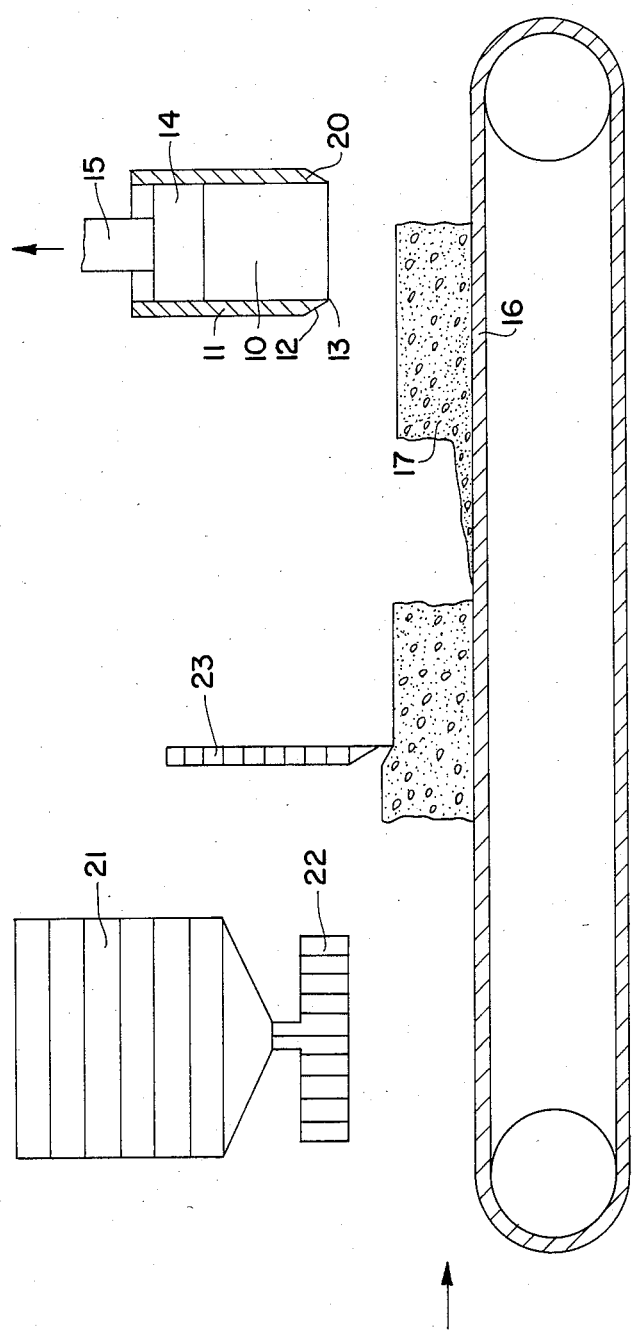

Referring to the drawings, a hollow vertically disposed cylinder 10 has a wall 11 of circular cross-section with a tapering portion 12 so that its lower end terminates in a sharp edge 13. Inside the cylinder is a piston 14 with piston rod 15. The cylinder and piston are fitted above a horizontal endless conveyor 16 carrying a sticky confectionary material 17. A shuttle table 18 for receiving the formed stable cake 19 is inserted in the space between the cylinder 10 and the endless conveyor 16 when the cylinder is in its ascended position. The tapering portion angle 20 is 15°. The sticky material 17 is contained in a hopper 21 and fed onto the conveyor by means of a feeding device 22 and levelled by means of a scraper 23.

In operation, six hollow vertical cylinders 10 are arranged close together in a row at right angles to the direction of travel of the horizontal endless conveyor 16. A band of the sticky material 17 of thickness 20 mm and having the same length and width as is covered by the cylinders is fed from the hopper 21 by means of the feeding device 22 onto the upper surface of the conveyor while it is stationary. When the conveyor starts to move it transports the band of sticky material firstly beneath the scraper 23 which removes any excess material and levels out the band to a uniform layer of thickness and then transports the layer to a position beneath the hollow vertical cylinders whereupon it stops (FIG. 1). The cylinders 10 and the pistons 14 descend together and the cylinder walls 11 cut through the sticky material until their sharp edges 13 contact the conveyor (FIG. 2) and thus divide the sticky material so that a portion lies within each cylinder. The pistons 14 then descend further and compress the portions of sticky material for two seconds to produce the formed cakes having 50% of their original thickness (FIG. 3) after which the cylinders and pistons ascend together carrying with them the formed cakes (FIG. 4). The pistons then redescend and press out the formed cakes to release them so that they fall on to the shuttle table 18 (FIG. 5) which is then retracted and carries them away. The pistons finally reascend within the cylinders to return to the position shown in FIG. 1 where the conveyor belt, which was fed with a further layer of sticky material while it was stationary and which restarted when the cylinders and pistons ascended at the stage shown in FIG. 4, has transported the sticky material to a position beneath the cylinders, and the cycle is repeated FIG. 6 shows a side view of the conveyor belt on which lies a band of sticky confectionary material 17, which has just been distributed by the feeding device 22, travelling in the downstream direction indicated by the arrow and passing beneath the scraper 23 and a further band of sticky material which has been levelled by the scraper to form a uniform layer of sticky material just arriving at a position beneath the cylinder 10 (the position shown in FIG. 1).

FIG. 7 shows six cylinders in the position shown in FIG. 4 while FIG. 8 shows the same six cylinders in the position shown in FIG. 5 releasing the formed cake 9 onto the shuttle table 18 which is automatically introduced into the space between the cylinder 10 and the endless conveyor when it is in its ascended position as shown in FIGS. 4 and 5.

I claim:

1. A method of forming a cake from a sticky confectionary material produced by adding a binder prepared by mixing 8 to 30 parts by weight of sucrose and/or glucose syrup and from 5 to 15 parts by weight of water, to a base in granular form prepared by mixing from 40 to 80 parts by weight of cereal flour, from 0 to 20 parts by weight of sucrose, from 0.5 to 3 parts by weight of oil or fat and from 0 to 3 parts by weight of water, and extrusion cooking under conditions such that an expanded cooked base having a density of from 0.1 to 0.3 g/cm$^3$ is obtained at the exit of an extrusion nozzle and reduced to granular form;

the method comprising the steps of depositing on an endless conveyor run intermittently said material in the form of plural bands of material extending transversely of said downstream direction, there being gaps between adjacent ones of such bands so that the bands and gaps are disposed in alternating sequence along the length of the conveyor, a scraper displacing material from the top of each such band into an adjacent one of said gaps as the band passes beneath the scraper upon movement of the conveyor to thereby form each band into a layer of substantially uniform thickness without unduly compressing the band and breaking the structure of the granules, transporting each layer to a position beneath at least one vertically disposed hollow cylinder whose wall is tapered at its lower end and inside which is a piston, advancing the cylinder downwardly so that it cuts through the sticky material until the lower edge of said cylinder contacts said surface and severs the sticky material within the cylinder from the layer, then advancing the piston downwardly to compress the severed sticky material to between about 40% and about 60% of its original thickness to form the cake, maintaining such compression for between 0.5 to 5.0 seconds, and then retracting the cylinder and piston together upwardly so that the cylinder and piston carry with them essentially without other means the formed cake, and then expelling and releasing the formed cake from the cylinder by advancing the piston downwardly.

2. A method according to claim 1 characterised in that the endless conveyor is stationary while the hollow cylinder is advanced and is moved when the hollow cylinder and piston are retracted upwardly together carrying with them the formed cake.

3. A method according to claim 1 characterised in that the lower edge of the tapering portion of the cylinder wall is sharp to facilitate cutting all the way through the sticky material.

4. A method according to claim 1 characterised in that a pattern is formed in the top face of the cake by the face of the piston which compresses the sticky material.

5. A process as claimed in claim 1 characterised in that the sticky material is compressed by the piston to between 45% and 55% of its original thickness.

6. A process as claimed in claim 5 characterised in that the compression of the sticky material by the piston is maintained for between 1.0 and 3.0 seconds.

7. A process as claimed in claim 6 characterised in that said compression is maintained for between 1.5 and 2.5 seconds.

8. An apparatus for forming cakes from a sticky confectionary granular material characterised in that it comprises an endless conveyor adapted to run intermittently in a predetermined downstream direction, above which is a vertically disposed hollow cylinder whose wall is tapered at its lower end and inside which is a piston, means for depositing a sticky confectionary material onto the endless conveyor upstream of the cylinder in the form of plural bands extending transversely of said downstream direction so that there are gaps extending transversely of said downstream direction between adjacent ones of said bands, scraper means mounted above the conveyor belt downstream of said depositing means and upstream of the cylinder for engaging each of said bands of material and displacing excess material from the top of each band so engaged into the gap upstream of such band as such band passes beneath the scraper means upon movement of the conveyor, whereby each of said bands of sticky material is formed into a layer of uniform thickness without unduly compressing the sticky bands of material and breaking the structure of the granules, means for lowering the cylinder to cut through the sticky material until its lower edge contacts the endless conveyor, means for lowering the piston after the lower edge of the cylinder contacts the conveyor so that the piston compresses the sticky material to a thickness between about 40% and about 60% of the thickness of said layer to thereby form a cake, said piston lowering means being operative to maintain the pressure of the piston on the cake for between 0.5 and 5.0 seconds, means for raising the cylinder and piston together carrying with them the formed cake, means for lowering the piston to press out and release the formed cake and means for transporting the formed cake away from the endless conveyor.

* * * * *

UNITED STATES PATENT AND TRADEMARK OFFICE
CERTIFICATE OF CORRECTION

PATENT NO. : 4,592,916

DATED : June 3, 1986

INVENTOR(S) : Yngve R. Akesson

It is certified that error appears in the above-identified patent and that said Letters Patent is hereby corrected as shown below:

Column 1, line 37, insert a comma after "biscuits".

Column 5, line 6, "uniform layer of thickness" should read -- layer of uniform thickness --.

Column 5, line 41, "9" should read -- 19 --.

Signed and Sealed this

Fourteenth Day of October, 1986

[SEAL]

Attest:

DONALD J. QUIGG

Attesting Officer

Commissioner of Patents and Trademarks